(12) United States Patent
Pothoff et al.

(10) Patent No.: US 12,417,153 B2
(45) Date of Patent: Sep. 16, 2025

(54) OPTIMIZATION OF LOG RECORD APPLICATION DURING DATABASE RECOVERY

(71) Applicant: BMC Software, Inc., Houston, TX (US)

(72) Inventors: William J. Pothoff, Austin, TX (US); Vladimir Prasolov, Tel Hai (IL); Konstantin Lavren Bobovich, Austin, TX (US)

(73) Assignee: BMC Software, Inc., Houston, TX (US)

( * ) Notice: Subject to any disclaimer, the term of this patent is extended or adjusted under 35 U.S.C. 154(b) by 48 days.

(21) Appl. No.: 18/401,293

(22) Filed: Dec. 29, 2023

(65) Prior Publication Data
US 2025/0217237 A1   Jul. 3, 2025

(51) Int. Cl.
*G06F 11/00* (2006.01)
*G06F 11/14* (2006.01)

(52) U.S. Cl.
CPC ...... *G06F 11/1471* (2013.01); *G06F 11/1469* (2013.01); *G06F 2201/80* (2013.01)

(58) Field of Classification Search
CPC .................. G06F 11/1469; G06F 11/1471
See application file for complete search history.

(56) References Cited

U.S. PATENT DOCUMENTS

| | | | | |
|---|---|---|---|---|
| 6,732,123 B1* | 5/2004 | Moore | ............. | G06F 11/1471 |
| 11,341,001 B1* | 5/2022 | Brahmadesam | .... | G06F 11/1471 |
| 12,130,798 B1* | 10/2024 | Brahmadesam | ........ | G06F 3/065 |
| 2004/0221116 A1* | 11/2004 | Hu | ........................ | G06F 16/284 711/158 |
| 2007/0124484 A1* | 5/2007 | Pearson | ................... | H04L 51/00 714/E11.13 |
| 2011/0035359 A1* | 2/2011 | Bendakovsky | ..... | G06F 11/1458 707/E17.007 |
| 2018/0373604 A1* | 12/2018 | Martin | ................ | G06F 11/1451 |
| 2022/0253409 A1* | 8/2022 | Beier | .................. | G06F 16/1734 |
| 2022/0414015 A1* | 12/2022 | Reisteter | ............. | G06F 16/2358 |
| 2023/0090266 A1* | 3/2023 | Zhang | ..................... | H04L 67/10 707/615 |
| 2023/0128784 A1* | 4/2023 | Zeltwanger | ....... | G06F 16/24568 714/3 |
| 2023/0153314 A1* | 5/2023 | Martin | ................ | G06F 16/2282 707/746 |
| 2024/0004867 A1* | 1/2024 | Pandis | .................. | G06F 16/254 |

* cited by examiner

*Primary Examiner* — Joshua P Lottich
(74) *Attorney, Agent, or Firm* — Brake Hughes Bellermann LLP

(57) ABSTRACT

A captured sequence of log records for a copy of a database may be inspected to identify an obviating log record at a captured sequence position of the captured sequence and related to a page of the plurality of pages, the obviating log record corresponding to an obviating change that replaces an earlier change of an earlier log record. The captured sequence of log records may be sorted into an applied sequence of log records for applying changes of the sequence of changes, in which the obviating log record is moved from the captured sequence position to an applied sequence position that is prior to the earlier sequence position of the earlier log record. The database may then be recovered using the applied sequence of log records.

20 Claims, 5 Drawing Sheets

300

| | RBA | PAGE | Logged Update |
|---|---|---|---|
| | 1000 | 3 | Insert key |
| 308 | 1020 | 3 | Insert key |
| | 1050 | 3 | Insert key |
| 310 | 1030 | 4 | Insert key |
| | 1070 | 4 | Insert key |
| 316 | 1130 | 5 | Page split (full page log record) |
| 318 | 1090 | 5 | Page split (full page log record) |
| | 1010 | 5 | Insert key |
| | 1040 | 5 | Insert key |
| | 1060 | 5 | Insert key |
| 312 | 1080 | 5 | Insert key |
| | 1110 | 5 | Insert key |
| | 1120 | 5 | Insert key |
| 320 | 1140 | 5 | Insert key |
| 314 | 1100 | 6 | Page split (full page log record) |

Columns: 302 (RBA), 304 (PAGE), 306 (Logged Update)

FIG. 3

OPTIMIZATION OF LOG RECORD APPLICATION DURING DATABASE RECOVERY

TECHNICAL FIELD

This description relates to database management.

BACKGROUND

Database technology enables storage, analysis, and retrieval of data. For example, database servers, database management systems, and database languages may be used to store records in a structured manner, insert or delete records, and query available records to retrieve desired information.

Many different types of computer software applications may utilize and benefit from such database technology. For example, applications across many different industries, such as ecommerce, finance (e.g., banking), network security, telecommunications, oil and gas, energy, government, education, manufacturing, or healthcare may all detect, generate, and/or store vast amounts of data particular to the context (e.g., industry) of each application.

Given the scale and criticality of such data, database systems typically include or utilize recovery techniques to guard against loss of data, maintain data integrity, and ensure efficient use of resources. Such recovery techniques, however, may themselves consume significant time and resources.

SUMMARY

According to one general aspect, a computer program product may be tangibly embodied on a non-transitory computer-readable storage medium and may include instructions. When executed by at least one computing device, the instructions may be configured to cause the at least one computing device to identify, for a database recovery, a copy for a database, the copy being stored at a first time as a plurality of pages. The instructions, when executed, may be further configured to cause the at least one computing device to identify a captured sequence of log records, the captured sequence of log records being captured between the first time and a second time and corresponding to a sequence of changes made to the database between the first time and the second time, with each log record of the captured sequence of log records corresponding to a change of the sequence of changes. The instructions, when executed, may be further configured to cause the at least one computing device to identify, in the captured sequence of log records, an obviating log record at a captured sequence position of the captured sequence of log records and related to a page of the plurality of pages, the obviating log record corresponding to an obviating change that replaces an earlier change of an earlier log record at an earlier sequence position within the captured sequence of log records and with respect to the page. The instructions, when executed, may be further configured to cause the at least one computing device to sort the captured sequence of log records into an applied sequence of log records for applying changes of the sequence of changes, in which the obviating log record is moved from the captured sequence position to an applied sequence position that is prior to the earlier sequence position of the earlier log record. The instructions, when executed, may be further configured to cause the at least one computing device to recover the database to the second time using the applied sequence of log records during the database recovery.

According to other general aspects, a computer-implemented method may perform the instructions of the computer program product. According to other general aspects, a system, such as a mainframe system or a distributed server system, may include at least one memory including instructions, and at least one processor that is operably coupled to the at least one memory and that is arranged and configured to execute instructions that, when executed, cause the at least one processor to perform the instructions of the computer program product and/or the operations of the computer-implemented method.

The details of one or more implementations are set forth in the accompanying drawings and the description below. Other features will be apparent from the description and drawings, and from the claims.

BRIEF DESCRIPTION OF THE DRAWINGS

FIG. 3 is a table of log record updates applied using the system of FIG. 1.

DETAILED DESCRIPTION

Figure 1:
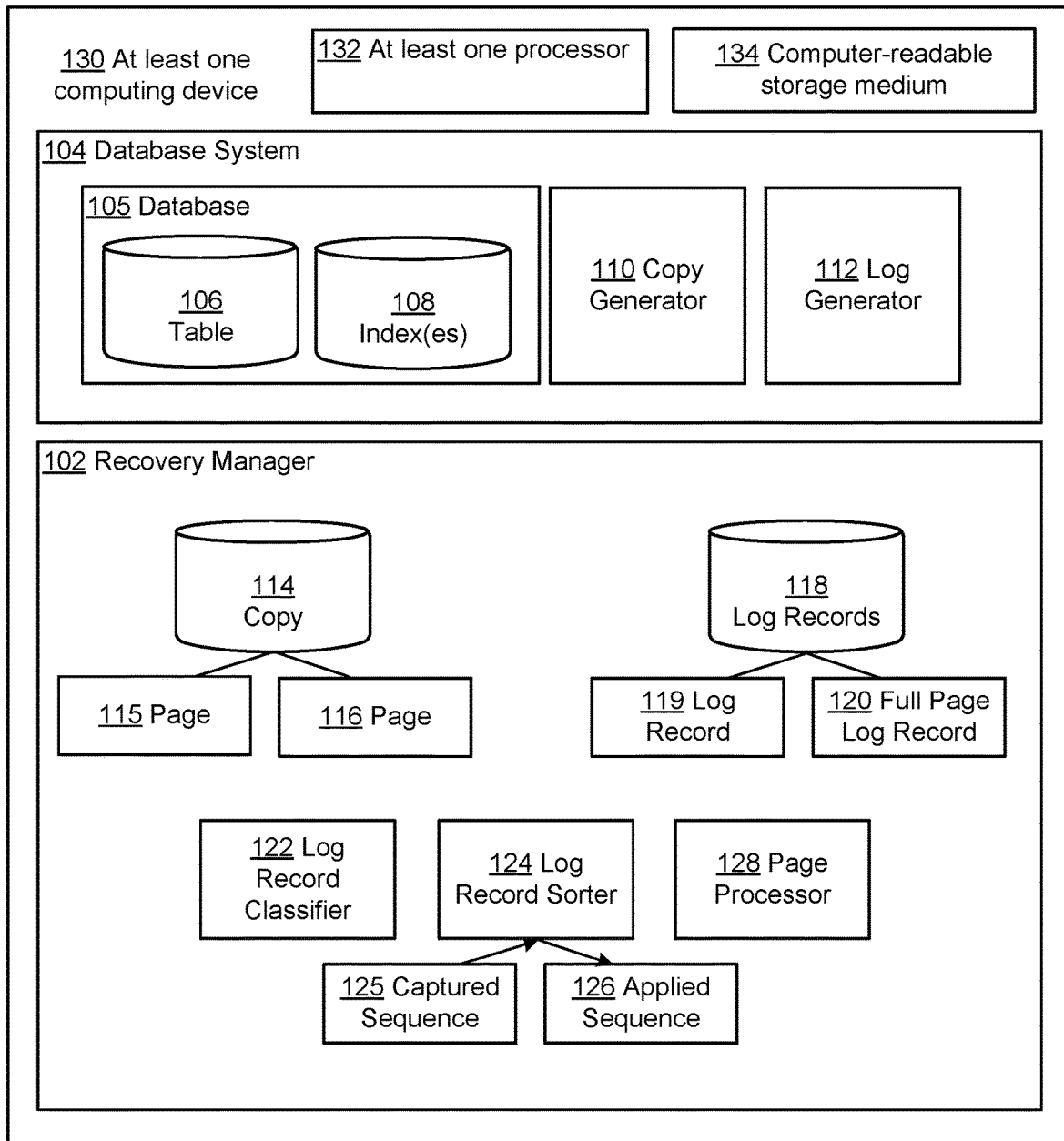
FIG. 1 is a block diagram of a system for optimized log record application during database recovery.

Described systems and techniques enable fast and efficient application of log records during database recovery operations. Accordingly, a number of processing cycles required for recovery operations may be reduced. Moreover, database tables and indexes may be quickly recovered from an event of a system crash or other system failure or error, to a desired point in time, e.g., after the system crash or other system error.

A database may include multiple tablespaces, each of which may include one or more tables. One or more indexes may be constructed and maintained for purposes of accessing desired information from corresponding tables in a fast and efficient manner. In many cases, a single database table may be associated with two or more indexes, with each index being constructed in a manner that is optimized for a corresponding type of data retrieval.

During normal operations of a database system, many of the database tables and corresponding indexes may be updated. For example, various applications may use the database tables, so that execution of jobs or tasks of the applications may result in inserts, deletes, or updates with respect to related tables. As just referenced, updates to tables often correspond with updates to related indexes, in order to maintain a desired relationship(s) between the tables and the indexes.

Any such changes to tables may be captured by various types of logging systems, in corresponding log records. For example, a log record may include an activity type of an associated table or index change (e.g., insert, update, or delete), before and after images of rows and/or columns, and various other types of relevant data.

Log records may also include information for identifying a time and/or sequence of the log records. Such information may be used to access desired log records, and/or to determine when a particular logged event occurred. For example, each log record may be assigned a timestamp. For example, each log record may be provided with a memory address. In specific examples, log records may each be assigned a log order value. For example, a relative byte address (RBA), which is an address expressed as a number of bytes from a referenced point to a desired address, may be used with respect to a single or stand-alone subsystem of a database system. When multiple subsystems of a database system are used, a log record sequence number also known as LRSN (which may be generated based on a timestamp) may be used to enable ordering of log records from multiple subsystems, and across the different subsystems.

There are multiple types of log-related processes. For example, log records may be used for system auditing or reporting, or for ensuring data consistency when a transaction fails and must be rolled back.

Log records are also used for system recovery, e.g., in the event of a system crash or other system failure or error. To enable system recovery, a copy of a database asset (e.g., a table, or an index) may be generated at a defined time. Then, a sequence of log records generated following the defined time (which may also be referred to as a logpoint) are captured and stored. If a system recovery is needed following the logpoint, then the copy and the sequence of log records may be used to recover the database asset.

For example, a database table or index that is routinely being updated, e.g., due to transactions of a related application, may be copied to form a copy at a known logpoint. For example, a database index may be copied at a known time, such as midnight, to obtain a corresponding copy. Then, a sequence of log records for the database index may be captured as the related transactions continue during subsequent normal operations and use of the database index.

If a system crash subsequently occurs, e.g., four hours later at 4 AM, so that the database index is lost, then the database index may be recovered to any desired point in time between midnight and 4 AM, using the corresponding copy and copies of the captured sequence of log records.

Often, and particularly for large database systems, the use of the corresponding copy and set of log records to recover a database asset copy to a desired point in time of the recovery (also referred to as a recovery point), may require an undesirably long recovery time window and/or an undesirably large number of processing cycles. For example, such recovery time windows may last for 5-10 seconds or more. In many scenarios, e.g., applications executing multiple transactions per second, such time windows may be undesirable or unacceptable. Although a recovery time window may be reduced by applying additional processing resources, such solutions may be impractical, expensive, or otherwise undesirable.

Described techniques identify and apply log records during database recovery operations in a manner(s) that reduces a total number of the stored sequence of log records, as compared to conventional recovery techniques. For example, described techniques may identify within the sequence of log records particular log records that contain updates which, once applied, obviate changes made by log records earlier in the sequence.

By identifying such obviating log records, described techniques may be used to sort the sequence of log records such that application of later-occurring but earlier-sorted ones of the sorted log records obviates a need to apply at least some of the earlier-occurring but later-sorted ones of the sorted log records. As a result, the later-sorted ones of the sorted log records need not be applied at all, thereby conserving system resources and decreasing a total number of log records and a total amount of time needed to complete the recovery operations.

Accordingly, as referenced above and described in detail, herein, described systems and techniques are provided that reduce a total recovery time and/or reduce quantities of processing resources needed for database recovery.

FIG. 1 is a block diagram of a system for optimized log record application during database recovery. In the example of FIG. 1, a recovery manager 102 is configured to optimize and enhance recovery operations of a database system 104.

For example, the database system 104 may include a plurality of databases, represented in FIG. 1 as a single database 105. Each such database may include a plurality of tablespaces, with each tablespace containing one or more tables. In FIG. 1, for purposes of brevity and simplicity, the database system 104 is illustrated as including the database 105, which is illustrated as including a single table 106 and one or more corresponding index(es), referred to herein as a single index 108.

The database system 104 may represent many different types of database systems. For example, the database system 104 may include or represent a database management system. The database system 104 may provide various related functionalities, such as user interfaces, user profile administration, security, resiliency, and various other logistical aspects of data management. For example, the database system 104 may represent the Db2® system of IBM. Further specific features and aspects of the database system 104 are not described in detail, except as may be necessary or helpful to understand operations of the recovery manager 102.

Although not separately illustrated in FIG. 1, the database system 104 may be understood to support operations of one or more applications, which may be used, for example, for ecommerce, finance (e.g., banking), network security, telecommunications, oil and gas, energy, and manufacturing, and for various entities such as business, government, education, or healthcare entities. Such applications may thus, for example, provide core functions of those entities, such as executing transactions with customers of those entities or other users of the applications (e.g., employees), producing goods for sale, or maintaining patient histories. Accordingly, the database system 104 may be used, for example, to support or enable individual customer transactions, telecommunication services, oil and gas, energy, or manufacturing production units or operations, student education records, government records, patient histories, or any related hardware or software operations.

For purposes of database recovery, the database system 104 may further include a copy generator 110 and a log generator 112. For example, as described above, either the table 106 and/or the index 108 may require recovery operations due to, e.g., a system crash, system error, data corruption, or other recovery reason(s).

Since such recovery reasons are typically difficult or impossible to predict, it is common to use the copy generator 110 to generate a copy 114 according to a defined schedule, or in response to a defined event. For example, the copy generator 110 may generate an instance of the copy 114 every hour, every day, or at any defined schedule. Additionally, or alternatively, the copy 114 may be generated in response to a defined event, such as when a particular (e.g., critical) update of the table 106 and/or the index 108 is/are completed.

In specific examples, the copy 114 may represent an image copy. In other examples, the copy 114 may represent a hardware-based instant snapshot copy, or an inline copy. Any suitable technique for creating the copy 114 (e.g., any suitable implementation of the copy generator 110), which may vary based on a type of the database system 104 and/or the database 105, may be used. In some cases, such as in the case of an image copy, the copy 114 may be required by the database system 104 to be static or read-only. Therefore, in the following description, any reference to a change(s) of the copy 114 should be understood to include scenarios in which the copy 114 is read into memory, changed/updated, and then read back to the corresponding database asset (e.g., the table 106 or the index 108) to recover the database asset, or scenarios in which the copy 114 is used to restore the database asset, the restored version of which may itself then be loaded into memory, changed and/or updated, and then read back. Such scenarios, and variations thereof, are common in database recovery practices, and are not described here in further detail, except as may be necessary or helpful in understanding operations of the recovery manager 102.

Generation of the copy 114 defines a first point in time that is referred to herein as the logpoint. The log generator 112 may generate log records 118 that capture all changes to the copy 114 that occur following the logpoint, up to a second point in time that is defined with respect to a desired recovery operation, referred to herein as the recovery point. As noted above, the copy generator 110 and the log generator 112 may be used for other purposes, as well, such as auditing or reporting purposes.

In the examples of FIG. 1, the recovery manager 102 is illustrated as being separate from the database system 104. In various implementations, however, the database system 104 may include native recovery functions. In other example implementations, the recovery manager 102 may separately provide optimized recovery operations that augment or supersede native recovery operations of the database system 104.

The copy 114 may refer to, e.g., a copy of the table 106 or of the index 108. In many of the following examples, the copy 114 is referred to with respect only to the index 108, for purposes of simplicity of explanation.

The copy 114 may be stored as a plurality of pages of data, represented in FIG. 1 as a page 115 and a page 116. In this context, such a page refers to a minimal, discrete quantity or unit of data that may be retrieved during a single input/output (I/O) operation. Other terminology may be used, such as a file, depending on how the database system 104 and the recovery manager 102 are configured.

A size of the page 115, 116 may vary, e.g., based on I/O capabilities of the database system 104 and related hardware resources. For example, in the example of Db2, referenced above, example page sizes may be 4 k, 8 k, 16 k, or 32 k of data.

Each of the pages 115, 116 may include page content and page metadata. Page content may refer to data that is specific to the table 106 and/or the index 108, and/or to related application(s) (not shown in FIG. 1) that may be utilizing the table 106 and/or the index 108.

In contrast, page metadata may refer to structural data that is not particular to specific page content, but that facilitates storage and access operations with respect to the pages 115, 116. For example, page metadata may include header and footer information defined across all the pages of the copy 114, so that desired pages may be stored and accessed in an efficient manner. Page metadata may also include information characterizing a type or nature of the page content of a given page, such as whether a page relates to the table 106 or the index 108.

The log records 118, as noted above, may be generated by the log generator 112 as a sequence of log records capturing a corresponding sequence of changes made to the table 106 and/or the index 108. For example, the copy 114 may be generated with respect to the index 108 at the logpoint. Then, as subsequent changes (e.g., insert or delete operations) are made to the index 108 during normal operations thereof, the log generator 112 may generate corresponding log records that capture such changes. In some cases, multiple log records may be generated for a single change to the index 108, such as when a replace operation generates a delete log record and an insert log record.

In the example of FIG. 1, the copy 114 and the log records 118 are illustrated in the context of the recovery manager 102. As noted above, the copy 114 and the log records 118 may be stored in the context of the database system 104 and accessed using the recovery manager 102.

The log records 118 represent a captured sequence of log records that is illustrated in the simplified example of FIG. 1 as a sequence that includes a log record 119 and a full page log record 120. The full page log record 120 is identified as being a full page log record, capturing a change to the index 108 that replaces or affects an entire page (e.g., all page content) of one of the pages 115, 116. The log record 119 may be understood to represent a log record that affects only a portion of a corresponding page (referred to as a partial page log record) or may also refer to a full page log record.

As described in detail, below, the full page log record 120 provides an example of what is referred to herein as an obviating log record. Such an obviating log record that occurs after an earlier log record is created, such as the log record 119, and corresponds to a change of the copy 114 (e.g., to a page thereof, which, prior to the change being applied, may have been loaded and/or copied to memory, or restored in the database 105 and then loaded and/or copied into memory) that obviates the change recorded by the log record 119.

For example, the log record 119 may reflect a partial page log record that changes only a portion of the page 115. Therefore, a change of the copy reflected in the full page log record 120 will obviate, e.g., replace or make unnecessary, the change(s) of the log record 119, avoiding duplication.

Further in FIG. 1, the recovery manager 102 is illustrated as including, or having access to, a log record classifier 122. The log record classifier 122 may be configured to classify each of the log records 118 as being either obviating or non-obviating. For example, the log record classifier 122 may be configured to classify each of the log records 118 as being either a full page log record or a partial page log record.

Then, a log record sorter 124 may be configured to use an output of the log record classifier 122 to change a captured sequence 125 of the log records 118 into a sorted, applied sequence 126. For example, the log record 119 may reflect a partial page change to the page 115 that occurs prior in time to a full page change of the full page log record 120 that affects all page content of the page 115.

Therefore, the captured sequence 125 might be written as: (log record 119), (full page log record 120). The captured sequence 125 may be ordered based on relative chronological occurrence of generation of each of the log records 119 and full page log records 120. For example, the log record 119 and the full page log record 120 may be ordered using a timestamp and/or address information, as noted above. For example, such address information (e.g., RBA) may be incremented for each byte added to the log records 118, as the corresponding byte is added. In this way, the RBA reflects a relative timing of such additions. LRSN, or other suitable address information, may also be used.

By classifying the full page log record 120 as an obviating, full page log record, the log record classifier 122 enables the log record sorter 124 to sort the full page log record 120 ahead of the log record 119 within an applied sequence 126 (with respect to the page 115), so that the applied sequence 126 might be written as: (full page log record 120), (log record 119). Or, since the full page log record 120 obviates a need to apply the log record 119, the applied sequence 126 may simply be written as: (full page log record 120), with the log record 119 omitted for purposes of being applied to the page 115.

The applied sequence 126 may then be applied to the copy 114, in particular, to the page 115, by a page processor 128. As referenced above, in some implementations, the copy 114 (e.g., individual pages 115, 116 thereof) may be loaded into memory prior to applying the applied sequence 126, after which the updated copy may be read back to the database 105. In other implementations, the copy 114 may be applied to the database 105 (e.g., to the table 106 or the index 108) to restore the database 105. Then, the applied sequence 126 may be applied to an in-memory version of the restored database, and the resulting updated pages may then be read back to the database 105.

The page processor 128 may identify the page 115 as corresponding to the applied sequence 126. The page processor 128 may thus apply the full page log record 120 to the page 115. If the log record 119 remains in the applied sequence 126, the page processor 128 may skip application of any change(s) thereof to the page 115, based on earlier operations of the log record classifier 122 and the log record sorter 124. In other implementations, as noted above, the log record 119 may simply be omitted from the applied sequence 126 by the log record sorter 124, so that the page processor 128 applies the change(s) of the full page log record 120 to the page 115. Operations of the log record classifier 122, the log record sorter 124, and the page processor 128 may be repeated with respect to the subsequent page 116 and its corresponding log records.

It will be appreciated that FIG. 1 illustrates a highly simplified example of the recovery manager 102. Additional and more detailed examples are provided below, with respect to FIGS. 2-5. For example, as described with respect to FIGS. 3-5, the log generator 112 may generate the log records 118 in a continuous manner, capturing interspersed changes that occur with respect to multiple pages of the copy 114, based on the underlying use and operation of the index 108 (and/or the table 106). For example, it may occur that a first change may affect the page 115 (corresponding to the log record 119), then a second change may affect the page 116 (corresponding to a log record not shown in FIG. 1), and a third change may again affect the page 115 (corresponding to the full page log record 120).

Thus, such changes may affect different pages at different times, in a largely unpredictable manner. Therefore, the log record sorter 124 may provide additional sorting functions, such as providing per-page sorting of the log records 118. Put another way, the log record sorter 124 may initially sort relevant log records 119 and full page log records 120 as relating to the page 115, while sorting other log records affecting page 116 into a different captured sequence of log records, even though some such changes may occur in between changes corresponding to the log record 119 and the full page log record 120.

In FIG. 1, the database system 104 should be understood to be executable by any suitable computing platform. For purposes of illustration and example, FIG. 1 shows that the database system 104, as well as the recovery manager 102, may be executed using at least one computing device 130. The at least one computing device 130 may include at least one processor 132. The at least one computing device 130 is also illustrated as including the non-transitory computer-readable storage medium 134. That is, the non-transitory computer-readable storage medium 134 may store instructions that, when executed by the at least one processor 132, cause the at least one computing device 130 to provide the functionalities of the recovery manager 102 and the database system 104.

For example, the at least one computing device 130 may represent one or more servers, a mainframe, one or more logical partitions, or one or more virtual machines. For example, the at least one computing device 130 may be implemented as two or more computing devices, such as servers, in communications with one another over a network. Accordingly, the recovery manager 102 (or individual components, modules, or portions thereof) may be implemented using separate devices in communication with one another, as well.

In specific examples, the at least one computing device 130 may be implemented in the context of a mainframe computing system. In such examples, as referenced above and described in more detail, below, the database system 104 may include Db2 from IBM. In other examples, however, the at least one computing device 130 need not represent a mainframe system, and the database system 104 may represent any suitable database system.

Figure 2:
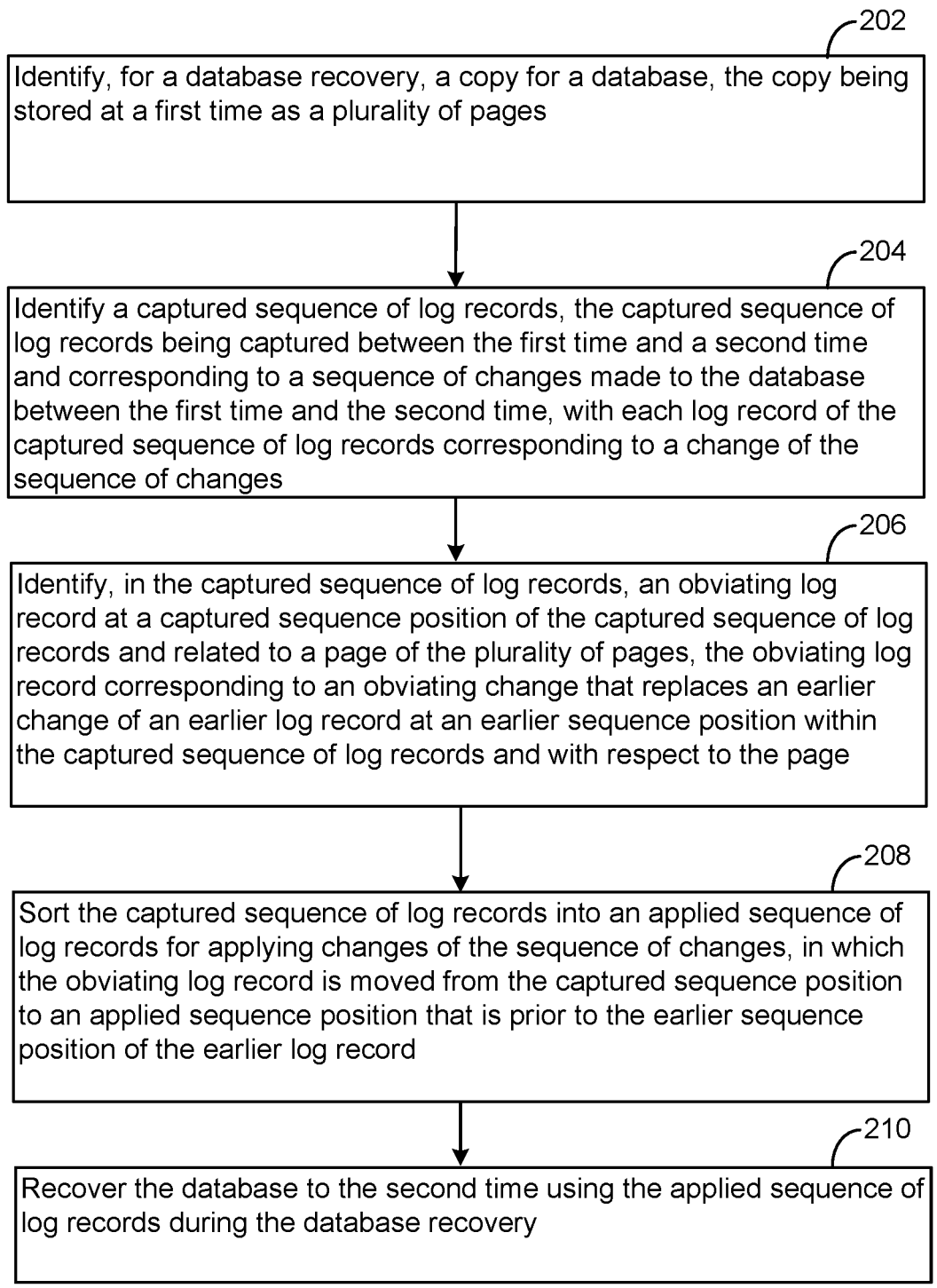
FIG. 2 is a flowchart illustrating example operations of the system of FIG. 1.

FIG. 2 is a flowchart illustrating example operations of the system of FIG. 1. In the example of FIG. 2, operations are illustrated as separate, sequential operations. In various implementations, the illustrated operations may include sub-operations, may be performed in a different order, may include alternative or additional operations, or may omit one or more operations. Further, in all such implementations, included operations may be performed in an iterative, looped, nested, or branched fashion.

In the example of FIG. 2, for a database recovery, a copy for a database may be identified, the copy being stored at a first time as a plurality of pages (202). For example, the copy 114 of FIG. 1 may be identified for a database recovery operation of the table 106 and/or the index 108. As described above, the copy 114 may include a plurality of pages represented as pages 115, 116, and may be stored according to any suitable recovery schedule or process for the table 106 and/or the index 108.

A captured sequence of log records may be identified, the captured sequence of log records being captured between the first time and a second time and corresponding to a sequence of changes made to the database between the first time and the second time, with each log record of the captured sequence of log records corresponding to a change of the sequence of changes (204). For example, the log records 118 may be identified as including the captured sequence 125 of log records, illustrated in FIG. 1 as (log record 119), (full page log record 120). As described above, the captured sequence 125 may be captured between a first time, corresponding to a time of generation of the copy 114 by the copy generator 110, also referred to as the logpoint, and a second time that corresponds to a desired recovery point. The log records 119 and full page log record 120 may correspond to the table 106, or to the index 108.

In the captured sequence of log records, an obviating log record at a captured sequence position of the captured sequence of log records may be identified and related to a page of the plurality of pages, the obviating log record corresponding to an obviating change that replaces an earlier change of an earlier log record at an earlier sequence position within the captured sequence of log records and with respect to the page (206). For example, the log record classifier 122 may search the captured sequence 125 (e.g., the log record 119 and the full page log record 120) to classify the log record 120 as a full page log record with respect to the page 115, while the log record 119 (occurring prior to the full page log record 120 within the captured sequence 125) may be classified as a partial page log record with respect to the page 115.

The captured sequence of log records may be sorted into an applied sequence of log records for applying changes of the sequence of changes, in which the obviating log record is moved from the captured sequence position to an applied sequence position that is prior to the earlier sequence position of the earlier log record (208). For example, the log record sorter 124 may sort the captured sequence 125 of (log record 119), (full page log record 120) into an applied sequence 126 of (full page log record 120), (log record 119), or just (full page log record 120).

The database may be recovered to the second time using the applied sequence of log records during the database recovery (210). For example, when recovering the index 108, corresponding pages of the copy 114 may be loaded into memory, updated as described herein, and then used to restore the index 108 (i.e., may be read back to the index 108). In other examples, the corresponding pages of the copy 114 may first be used to restore the index 108 to the recovery point, whereupon the index 108 that is restored may be read into memory for application of the processed log records, after which the index 108 may be read back from memory. For example, in any such scenarios, the page processor 128 may apply the full page log record 120, then, if the log record 119 is included in the applied sequence, it may be skipped as being obviated by application of the full page log record 120 earlier within the applied sequence 126.

Figure 4:
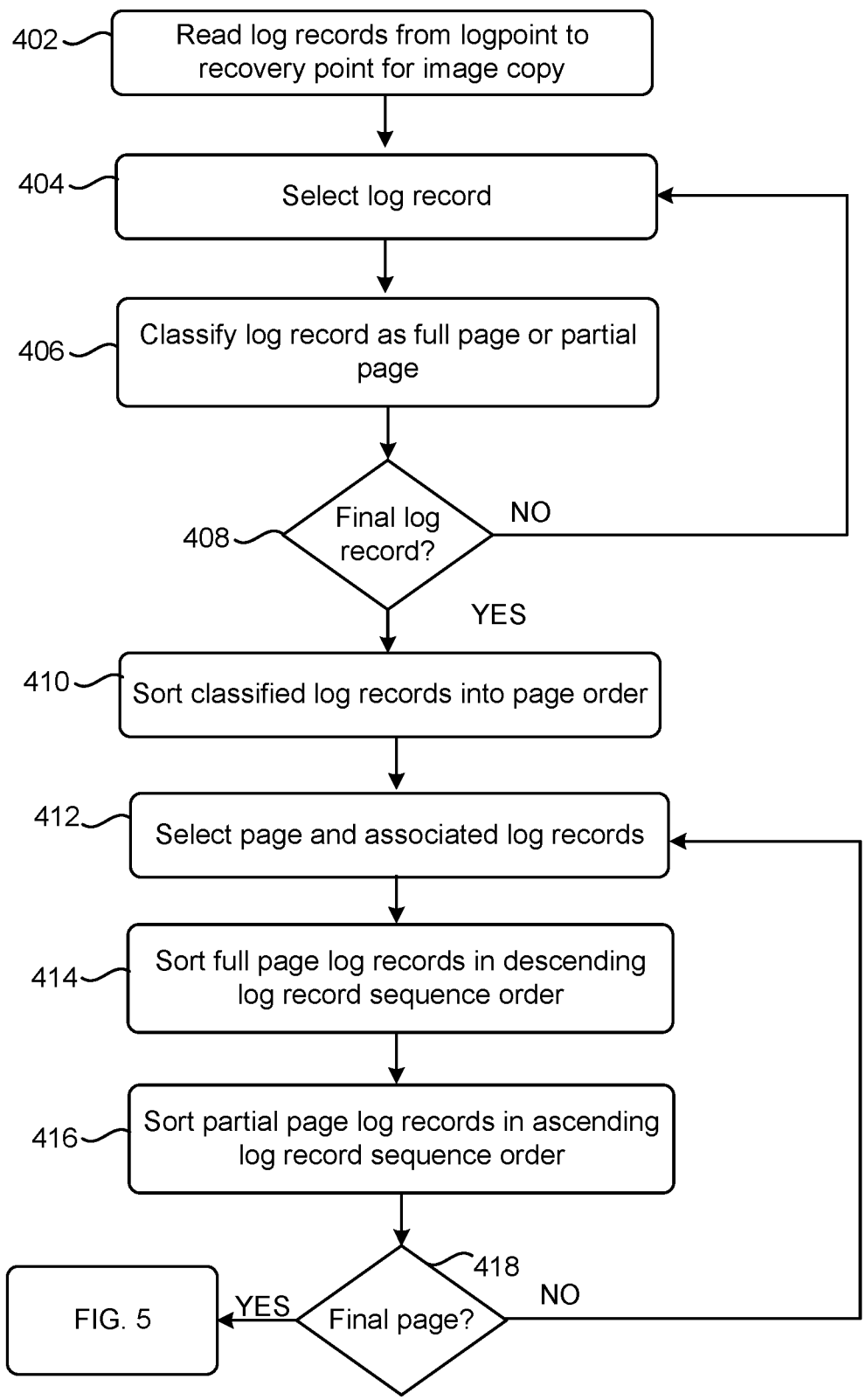
FIG. 4 is a flowchart illustrating detailed example operations of the system of FIG. 1 for classifying and sorting log records.
Figure 5:
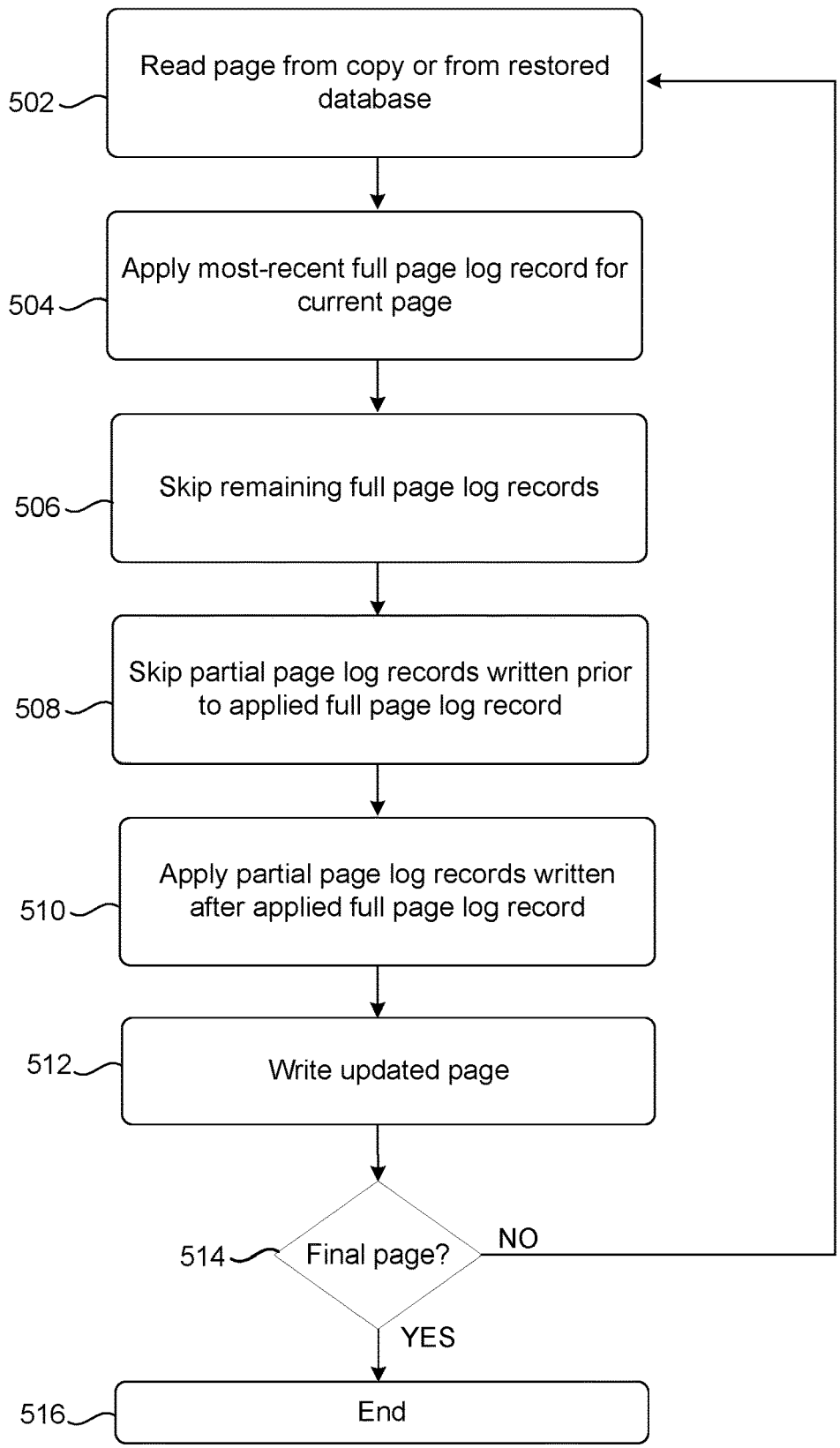
FIG. 5 is a flowchart illustrating detailed example operations of the system of FIG. 1 for applying log records.

FIG. 3 is a table 300 illustrating a more detailed example implementation of the system of FIG. 1. FIGS. 4 and 5 are flowcharts illustrating detailed example operations of the systems of FIGS. 1 and 3. In the examples of FIGS. 3-5, the database system 104 may be implemented using the Db2 system of IBM, so that specific examples of components of the database system 104 of FIG. 1 may be referenced below using Db2 examples and nomenclature.

In FIG. 3, a column 302 indicates a log record RBA, a column 304 indicates a page affected by a log record, and a column 306 indicates individual log records. In the example of FIG. 3, log records are indicated for each corresponding RBA, where the sequence of RBAs is illustrated as 1000, 1010, 1020, 1030, 1040, 1050, 1060, 1070, 1080, 1090, 1100, 1110, 1120, 1130, and 1140.

As may be observed from column 304, the various RBAs of column 302 and corresponding log records of column 306 may each affect a corresponding page of the copy 114 of FIG. 1. For example, log records 308 all affect a page identified as page 3 of a sequence of pages 3, 4, 5, and 6, while log records 310 affect page 4, log records 312 affect page 5, and log record 314 affects page 6.

As noted above, and reflected in FIG. 3, from a chronological perspective, log records may be generated with respect to changes made to any relevant page(s). For example, changes to a database table 106 or index 108 may be dictated by operations (e.g., transactions) of a related application, so that consecutive log records 118 may affect different copy pages 115, 116. For example, as shown in FIG. 3, a log record with RBA 1030 affects page 4 in column 304, while a subsequent consecutive log record with RBA 1040 affects page 5, and a further subsequent consecutive log record with RBA 1050 affects page 3.

Therefore, in FIG. 3, the log record sorter 124 of FIG. 1 may be configured to first sort or group log records by page, prior to, or in conjunction with, operations of the log record classifier 122. That is, as referenced above, log records 308 all affect page 3, while log records 310 affect page 4, log records 312 affect page 5, and log records 314 affects page 6. Consequently, further operations of the log record sorter 124 and of the page processor 128 may be implemented on a per-page basis.

For example, with respect to copy page 5 in FIG. 3, row 316 corresponds to a type of full page log record 120 of FIG. 1 with RBA 1130, referred to herein as a page split, providing an example of the type of obviating log record referenced above with respect to FIG. 2 and illustrated with respect to the full page log record 120 of FIG. 1.

More specifically, and as discussed in more detail, below, with respect to FIG. 4, a page split update may occur, e.g., when the copy 114 is a copy of the index 108. Due to a highly structured nature of the index 108, it may be problematic to insert new data into the index 108, e.g., into a page of the copy 114 of the index 108, where the relevant page is already full or close to full (e.g., a maximum page size has been reached). The page split operation splits such a page into two pages, while maintaining a logical order of the two pages within the structure of the index 108, thereby creating the page space needed to insert the new data in a desired manner. As described herein, the creation of such page space obviates change(s) made within that page space at an earlier time(s).

Consequently, a remainder of log records affecting page 5 are classified and sorted, beginning with a row 318, as being obviated by application of the log record of the row 316, up until a log record of a row 320 having a RBA of 1140 that occurs after the obviating log record of the row 316. As a result, when updating page 5, the page processor 128 may process and apply the obviating log record of the row 316 (analogous to the full page log record 120 of FIG. 1), which obviates a need to apply any of the log records from row 318 up until (and excluding) the log record of the row 320 (analogous to the log record 119 of FIG. 1).

In particular, as also described with respect to FIG. 3, the log record of the row 316 may be sorted ahead of the log record of the row 318, because the former log record has a RBA of 1130 and therefore occurs after (and obviates) application of the latter log record having a RBA of 1090. Then, the log record of the row 320, which occurs after, and is not obviated by, the log record of the row 316, may be applied to complete processing of updates to page 5.

FIG. 4 is a flowchart illustrating detailed example operations of the system of FIG. 1 for classifying and sorting log records, described with respect to FIGS. 1-3. FIG. 5 is a flowchart illustrating detailed example operations of the system of FIG. 1 for applying log records, also discussed with respect to FIGS. 1-3.

In FIG. 4, log records may be read from the log records 118 between the logpoint and recovery point for a given copy (402). For example, in FIG. 1, the copy 114 may be captured at a specified logpoint with respect to either the table 106 or the index 108. The copy 114 may include multiple pages, represented by the page 115 and the page 116 of FIG. 1, or the pages labeled page 3, 4, 5, and 6 in the column 304 of FIG. 3.

In FIG. 3, for simplification, a timestamp or an RBA preceding an earliest RBA of column 302 may represent the logpoint at which the copy 114 is generated. For example, the earliest illustrated RBA is RBA 1000, so the copy 114 may be captured at a time and/or RBA preceding RBA 1000. The recovery point may be understood to be represented by the latest-occurring RBA of 1140, although, of course, later RBAs and associated log records may be included if desired and/or are available.

In practice, generation of the copy 114 by the copy generator 110 is not instantaneous, so that updates (and corresponding log records 118) may occur during a window of time between the logpoint and a completion of the generation of the copy 114. Such a window of time may be referred to herein as a copy generation time window.

It is desirable for the copy 114 to be entirely consistent as of a specific point in time or RBA, i.e., for the copy 114 to provide a consistent copy of the underlying database asset. However, the copy 114 may include data inconsistencies as a result of updates that occur during the copy generation time window.

For example, a 'replace' operation may include 'delete' and 'insert' operations, where the 'delete' operation may be included within the copy generation time window and the corresponding 'insert' operation may not be included therein. To ensure a consistent copy, data deleted by the original 'delete' operation may be reinstated or added back (i.e., the 'delete' operation may be undone). More generally, any operation that is not fully committed and/or completed may be undone in order to maintain a consistent copy.

Conventional database recovery systems may be inefficient in maintaining the copy 114 as a consistent copy. For example, it may be difficult to identify an uncommitted operation that needs to be undone, because the uncommitted operation may have been affected by an intervening page split. For example, a 'delete' update may have initially been stored on a specific page but may have been moved to a different page as part of a page split operation, making the 'delete' operation difficult to correct or undo using conventional techniques.

Using described techniques, however, such changes may be automatically reflected through the described use of obviating log records. That is, an update that would conventionally be identified and corrected (e.g., undone) to maintain a consistent copy may be obviated by application of a subsequently occurring, obviating (e.g., full page) update. Put another way, by executing described techniques, many or all of the updates occurring within the copy generation time window that require correction/undoing may be corrected in a fast, efficient manner, by classifying and sorting full page or other obviating log records for page processing, as described herein.

A log record may be selected from the relevant log records (404). The selected log record may be classified as being full page or partial page (406). If more log records are available (408), the classification (404, 406) may continue, until a final log record of the relevant log records is reached (408).

For example, as described above, the log record classifier 122 of FIG. 1 may be configured to classify each log record as obviating (e.g., full page) or non-obviating (e.g., partial page). In example implementations, when the database system 104 is the Db2 system of IBM, which is referenced above, the log record classifier 122 may first determine whether the log record being classified relates to a copy of the table 106 or the index 108.

For the index 108, a flag may be set in the log record that indicates that the log record contains a complete image of the relevant page (e.g., of all page content, not page metadata). Such a flag may be set for, e.g., the page split operations referenced above, a page format, a page delete, a multi-page delete, or a utility load operation.

It may also be possible to determine that a log record (e.g., the full page log record 120) rewrites an entire page by examining identifiers in the log data. For example, there may be identifiers in the log record that identify the origin or purpose of the log record, which may be used to determine that the log record could be used to generate a complete page image. For example, a log record can include a "log record type" indicating that it was written for the purpose of splitting an index page, and this identifying information may be used to determine that the log record includes a complete image of the page.

In other examples, a log record may be determined to rewrite an entire page through examination of relevant log data. For example, a log record may be determined to format an empty page when setting metadata on the page (e.g., free space amount, free space pointer) to a maximum value, indicating that the page contains no data. In this case, the entire physical image of the page may not be contained in the log record, but a complete logical image of the page (an empty, formatted page) may be derived from such a log record.

Other techniques may be used, perhaps in the context of other database systems, to recognize index log records that either rewrite an entire index page, or from which a complete index page can be derived. Relevant techniques include inspecting a flag or other indicator that indicates a log record is such a record, by looking at identifiers (e.g., type or source) in the log record, or by looking at the content of an update represented by the log record.

With respect to table space data, a flag may be included or added that indicates that a log record contains a full page image. In other implementations, it may be possible to identify log records that rewrite an entire table space page using techniques similar to those described above to examine identifiers within the log data and/or by examining the log data itself.

For example, log record identifiers such as log record type or log record source may be used to determine that a log record was written for the purpose of formatting a data page. Even if the log record does not contain a complete page image, the page may be reconstructed since the contents of a formatted page are known without having access to the log record.

In other implementations, a log record may be determined to rewrite the entire page by examining the log data. For example, a log record may be determined to be formatting an empty page because the log record sets metadata on the page (e.g., free space amount, free space pointer) on the page to the maximum value, indicating that the page contains no data. Again, the entire physical image of the page may not be contained in the log record, but a complete logical image of the page (e.g., an empty, or a formatted page) may be derived from such a log record.

Once all log records are classified, the classified log records may be sorted into page order (410). For example, in FIG. 1, the log records 119 and full page log records 120 may be sorted by the log record sorter 124 as both relating to the page 115. In FIG. 3, the various log records may be page-sorted into the log records 308 for page 3, the log records 310 for page 4, the log records 312 for page 5, and the log records 314 for page 6.

Then, a page and associated log records may be selected (412). For example, in FIG. 1, the page 115 (and log records 119 and full page log records 120) may be selected. In FIG. 3, the following discussion is primarily provided with respect to selection of page 5 and the group 312 of log records, but described operations may be applied to any of the groups 308, 310, or 314 of log records, as well.

Assuming multiple log records for the page being sorted, included log records previously classified as being full page may be sorted in descending log record sequence order (414). For example, in FIG. 3, for page 5, log records of the row 316 and the row 318 are classified as full page log records. The log record of the row 316 is sorted ahead of the log record of the row 318, because the former has a RBA of 1130 and the latter has a RBA of 1090. That is, the log record of the row 316 occurs after the log record of the row 318, and, being an obviating and/or full page log record, will obviate the log record of the row 318 if applied prior thereto.

Remaining, non-obviating (e.g., partial page) log records may be sorted after the obviating and/or full page log records, e.g., in ascending log record sequence order (416). For example, in FIG. 3, the log records of rows between the row 318 and up to (and including) the log record of the row 320 are sorted in ascending order.

If the final page has not been reached (418), page (and associated log record) sorting may continue (412-416). Otherwise, processing may continue to the page processing operations of FIG. 5, e.g., performed by the page processor 128.

The example of FIG. 4 illustrates multiple sorting operations, for clarity and ease of explanation. However, it will be appreciated that two or more of the sorting operations may be included in a single sort operation, or, conversely, additional sorting operations (not shown in FIG. 4) may be included.

In FIG. 5, a page to be processed is read (e.g., read into memory) from the copy 114 or from a restored version of the database 104 that has been restored using the copy 114 (502). A most-recent full page log record for the current page is applied (504). For example, the log record of the row 316 may be applied. Then, remaining full page log records may be skipped (506). For example, the log record of the row 318 of FIG. 3 may be skipped as having been obviated by application of the log record of the row 316.

Partial page log records written prior to any preceding full page log record may be skipped (508), because the update reflected in the skipped log record would have been overwritten and obviated by the more recent full page log record applied in (504).

Then, partial page log records written after the full page log record applied in (504) may be applied (510). For example, the log record of the row 320 may be applied.

The updated page may then be written back to the database 104, e.g., to the table 106 or the index 108 (512) that correspond. If a final page has not been reached (514), page processing may continue (502-512). Otherwise, page processing may end (516).

Implementations of the various techniques described herein may be implemented in digital electronic circuitry or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may, or be operatively coupled to, receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the embodiments.

What is claimed is:

1. A computer program product including a non-transitory computer-readable storage medium storing instructions that, when executed by at least one computing device, are configured to cause the at least one computing device to:
identify, for a database recovery, a copy for a database, the copy being stored at a first time as a plurality of pages;
identify a captured sequence of log records, the captured sequence of log records being captured between the first time and a second time and corresponding to a sequence of changes made to the database between the first time and the second time, with each log record of the captured sequence of log records corresponding to a change of the sequence of changes;
identify, in the captured sequence of log records, an obviating log record at a captured sequence position of the captured sequence of log records and related to a page of the plurality of pages, the obviating log record corresponding to an obviating change that replaces an earlier change of an earlier log record at an earlier sequence position within the captured sequence of log records and with respect to the page;
sort the captured sequence of log records into an applied sequence of log records for applying changes of the sequence of changes, in which the obviating log record is moved from the captured sequence position to an applied sequence position that is prior to the earlier sequence position of the earlier log record; and
recover the database to the second time using the applied sequence of log records during the database recovery.

2. The computer program product of claim 1, wherein the copy is a copy of an index of the database.

3. The computer program product of claim 1, wherein the instructions are further configured to cause the at least one computing device to:
classify each log record of the captured sequence of log records as either a full page log record affecting full page content or as a partial page log record affecting a portion of page content of a corresponding page of the plurality of pages.

4. The computer program product of claim 1, wherein the instructions are further configured to cause the at least one computing device to:
identify the obviating log record as corresponding to a full page log record affecting full page content of a corresponding page of the plurality of pages.

5. The computer program product of claim 1, wherein the instructions are further configured to cause the at least one computing device to:
sort the captured sequence of log records by page of the plurality of pages.

6. The computer program product of claim 1, wherein the instructions are further configured to cause the at least one computing device to:
select a selected page of the plurality of pages of the captured sequence of log records; and
classify corresponding log records for the selected page as either a full page log record affecting full page content of the selected page or as a partial page log record affecting a portion of page content of the selected page.

7. The computer program product of claim 6, wherein the instructions are further configured to cause the at least one computing device to:
sort one or more full page log records of the selected page in descending log record sequence order within the applied sequence of log records to identify a first full page log record of the sorted one or more full page log records as the obviating log record.

8. The computer program product of claim 7, wherein the instructions are further configured to cause the at least one computing device to:
sort partial page log records of the selected page in ascending log record sequence order, following the one or more full page log records, within the applied sequence of log records.

9. The computer program product of claim 8, wherein the instructions are further configured to cause the at least one computing device to:
apply the first full page log record of the sorted one or more full page log records within the applied sequence of log records to the selected page; and
skip application of a second or subsequent full page log record of the sorted one or more full page log records within the applied sequence of log records, if any, to the selected page.

10. The computer program product of claim 8, wherein the instructions are further configured to cause the at least one computing device to:
apply the first full page log record of the sorted one or more full page log records within the applied sequence of log records to the selected page; and
skip application of a partial page log record of the sorted partial page log records to the selected page when the partial page log record occurs prior to the first full page log record within the captured sequence of log records.

11. A computer-implemented method, the method comprising:
identify, for a database recovery, a copy for a database, the copy being stored at a first time as a plurality of pages;
identifying a captured sequence of log records, the captured sequence of log records being captured between the first time and a second time and corresponding to a sequence of changes made to the database between the first time and the second time, with each log record of the captured sequence of log records corresponding to a change of the sequence of changes;
identifying, in the captured sequence of log records, an obviating log record at a captured sequence position of the captured sequence of log records and related to a page of the plurality of pages, the obviating log record corresponding to an obviating change that replaces an earlier change of an earlier log record at an earlier sequence position within the captured sequence of log records and with respect to the page;
sorting the captured sequence of log records into an applied sequence of log records for applying changes of the sequence of changes, in which the obviating log record is moved from the captured sequence position to an applied sequence position that is prior to the earlier sequence position of the earlier log record; and
recovering the database to the second time using the applied sequence of log records during the database recovery.

12. The method of claim 11, further comprising:
classifying each log record of the captured sequence of log records as either a full page log record affecting full page content or as a partial page log record affecting a portion of page content of a corresponding page of the plurality of pages.

13. The method of claim 11, further comprising:
identifying the obviating log record as corresponding to a full page log record affecting full page content of a corresponding page of the plurality of pages.

14. The method of claim 11, further comprising:
selecting a selected page of the plurality of pages of the captured sequence of log records; and
classifying corresponding log records for the selected page as either a full page log record affecting full page content of the selected page or as a partial page log record affecting a portion of page content of the selected page.

15. The method of claim 14, further comprising:
sorting one or more full page log records of the selected page in descending log record sequence order within the applied sequence of log records to identify a first full page log record of the sorted one or more full page log records as the obviating log record.

16. The method of claim 15, further comprising:
sorting partial page log records of the selected page in ascending log record sequence order, following the one or more full page log records, within the applied sequence of log records.

17. The method of claim 16, further comprising:
applying the first full page log record of the sorted one or more full page log records within the applied sequence of log records to the selected page;
skipping application of a second or subsequent full page log record of the sorted one or more full page log records within the applied sequence of log records, if any, to the selected page; and
skipping application of a partial page log record of the sorted partial page log records to the selected page when the partial page log record occurs prior to the first full page log record within the captured sequence of log records.

18. A system comprising:
at least one memory including instructions; and
at least one processor that is operably coupled to the at least one memory and that is arranged and configured to execute instructions that, when executed, cause the at least one processor to:
identify, for a database recovery, a copy for a database, the copy being stored at a first time as a plurality of pages;
identify a captured sequence of log records, the captured sequence of log records being captured between the first time and a second time and corresponding to a sequence of changes made to the database between the first time and the second time, with each log record of the captured sequence of log records corresponding to a change of the sequence of changes;
identify, in the captured sequence of log records, an obviating log record at a captured sequence position of the captured sequence of log records and related to a page of the plurality of pages, the obviating log record corresponding to an obviating change that replaces an earlier change of an earlier log record at an earlier sequence position within the captured sequence of log records and with respect to the page;
sort the captured sequence of log records into an applied sequence of log records for applying changes of the sequence of changes, in which the obviating log record is moved from the captured sequence position to an applied sequence position that is prior to the earlier sequence position of the earlier log record; and
recover the database to the second time using the applied sequence of log records during the database recovery.

19. The system of claim 18, wherein the instructions are further configured to cause the at least one processor to:
select a selected page of the plurality of pages of the captured sequence of log records;
classify corresponding log records for the selected page as either a full page log record affecting full page content of the selected page or as a partial page log record affecting a portion of page content of the selected page;
sort one or more full page log records of the selected page in descending log record sequence order within the applied sequence of log records to identify a first full page log record of the sorted one or more full page log records as the obviating log record; and
sort partial page log records of the selected page in ascending log record sequence order, following the one or more full page log records, within the applied sequence of log records.

20. The system of claim 19, wherein the instructions are further configured to cause the at least one processor to:
apply the first full page log record of the sorted one or more full page log records within the applied sequence of log records to the selected page;
skip application of a second or subsequent full page log record of the sorted one or more full page log records within the applied sequence of log records, if any, to the selected page; and
skip application of a partial page log record of the sorted partial page log records to the selected page when the partial page log record occurs prior to the first full page log record within the captured sequence of log records.

* * * * *